UNITED STATES PATENT OFFICE.

BYRON E. ELDRED AND GAIL MERSEREAU, OF NEW YORK, N. Y., ASSIGNORS TO CHEMICAL DEVELOPMENT COMPANY, A CORPORATION OF MAINE.

PROCESS OF REGULATING CATALYSIS.

1,308,777.  Specification of Letters Patent.  Patented July 8, 1919.

No Drawing. Application filed August 8, 1912, Serial No. 714,022. Renewed December 13, 1918. Serial No. 266,650.

*To all whom it may concern:*

Be it known that we, BYRON E. ELDRED and GAIL MERSEREAU, citizens of the United States, residing at New York, in the county of New York and State of New York, have invented certain new and useful Improvements in Processes of Regulating Catalysis, of which the following is a specification.

This invention relates to processes of regulating catalysis; and it comprises a method of regulating reactions of unsaturated gases or vapors wherein such gas or vapor is subjected to the reaction of catalysts under temperature-controlled conditions and in the presence of a sufficient amount of a diluent gas or vapor, inert under the conditions of reaction, to slow down the reaction sufficiently to stop at a desired point or stage, a point short of that to which such reaction would naturally proceed; and it more particularly comprises a method of forming ethylene from acetylene wherein such acetylene is admixed with the proper amount of hydrogen, or gas containing the same, the admixture diluted with a gas, such as carbon dioxid, inert under the reaction conditions and in amount sufficient to slow down the hydrogenation and other reactions to a controllable degree, and the admixture is led over a catalyst, such as nickel, cobalt, iron, copper, platinum, palladium, etc., under temperature controlled conditions until formation of ethylene is complete; all as more fully hereinafter set forth and as claimed.

As is well known, many bodies, such as platinum and palladium, have the power of condensing and "adsorbing" various gases and effecting catalytic reactions therewith. In the "Sabatier & Senderens synthesis" recently reduced nickel, cobalt, iron or copper is used for the same purpose; nickel being the most reactive. Many carbon compounds may be caused to add hydrogen or substitute hydrogen for oxygen by passing a mixture of the compound with hydrogen over nickel, etc., as in converting benzol to cyclohexane or carbon dioxid to methane. With unsaturated hydrocarbons however the reaction, and particularly with nickel, is apt to go too far. It is, for example, difficult to short-hydrogenate acetylene in the presence of these catalytics to obtain ethylene in any yield, the reaction tending to go forward to completion and produce ethane to the extent possible with the amount of hydrogen present with condensation and polymerization of residual acetylene. Such ethylene as is produced tends to condense also for the most part to produce oils.

In the present invention the reaction is restrained and controlled by the simple expedient of diluting the reacting gases with an inert gas or vapor; a gas or vapor other than those resulting from the action or used in such action. With a suitable dilution by gases or vapors inert in the reaction taking place and with a proper temperature control of the catalyst, a wide variety of useful chemical reactions can be initiated and smoothly conducted to the desired stage of completion. The present invention however will be hereinafter more specifically described in its application to the manufacture of ethylene from acetylene.

Acetylene in contact with reduced nickel at common temperatures, and in contact with iron, copper and cobalt at somewhat higher temperatures undergoes polymerization or decomposition, or commonly, both, yielding indefinite proportions of solid, liquid and gaseous hydrocarbons with, usually, more or less free carbon. It may be wholly decomposed into carbon and hydrogen. With copper a peculiar corky carbonaceous body, "cuprene," may be obtained. On mixing hydrogen with acetylene and passing over the catalysts, the reactions and the evolution of heat become still more energetic, both hydrogenating and breaking down actions occurring simultaneously. With an excess of hydrogen, it is not difficult to obtain ethane with a fairly good yield; but with merely enough hydrogen to form ethylene, the yield of the latter is not great, much of the acetylene being converted into other products while the hydrogen mostly goes to form ethane as before. On passing a mixture of equal volumes of acetylene and hydrogen into a tube containing nickel and palladium on petroleum coke (as a carrier to increase the surface) an energetic reaction takes place, beginning first at some localized point possibly six or eight inches down the tube and quickly jumping from piece to piece of the catalyst until it all becomes heated. Finally the reaction draws back to a point near the place of introduction of the mixed gases where the coke becomes red hot and the flame of acetylene burning in hydrogen may become distinctly visible. The product of the action is nothing very definite. But on now diluting the acetylene-hydrogen mixture with a third to a half its volume of carbon dioxid or ethane, the reaction instead of being localized spreads out over the tube and becomes smooth and regular with the production of good yields of ethylene. With, say, a passage over 18 inches of catalyst the reaction may be complete.

Using carbon dioxid or products of combustion as the diluent, the ethylene formed may be scrubbed out and recovered with the use of "wash oil;" by passing the effluent gases through a tower against a current of oil of turpentine, a suitable petroleum oil, or the like, the charged oil being subsequently heated to revaporize the ethylene and recover such oil for re-use. Pressure and vacuum may be used in charging and discharging. Scrubbing in this manner, the washed diluent gas may be returned for re-use, or the ethylene, in making ether, etc., may be absorbed in a liquid, such as sulfuric acid, with which it reacts chemically. The diluted ethylene may be admixed with chlorin to form ethylene dichlorid (Dutch liquid), the diluent gas acting usefully in restraining the violence of the action and preventing the formation of other chlorination products. After condensing out the dichlorid, the diluent gas may be returned for use anew. With carbon dioxid as a diluent, this can be absorbed out by lime to give pure ethylene, or it can be removed and recovered by liquefaction.

The catalytic operation may be performed in a tube having means for controlling the temperature; and the catalyst may be used as a layer or train of active metal, or, and preferably, be carried on a carrier such as asbestos, kieselguhr, pumice stone, etc., to extend the area of contact with the gas. Petroleum coke is a particularly good carrier since in addition to good physical properties for this purpose it has the advantage of being nearly ashless enabling a good recovery of catalyst when its activity lessens by simply burning the catalyst-carrying mass, and as it is a relatively good conductor of heat, it keeps the temperature of the reactive particles of catalyst equalized, restraining undue heating of the same. In taking advantage of this property, it is better to have the charge of catalyst on the coke relatively small as this gives the catalyst as isolated particles.

Another expedient which may be used to good advantage is to have the catalyst occur in heat-conducting relationship to a body of a good heat-conductive metal, such as copper, such body, in turn, being in heat-transmitting relationship to means, such as a body of hot or cold fluid, for controlling the temperature. For example, a rod or wire of copper may have part of its body extending into a reaction chamber while another part extends into a heat-controlling jacket. On the portion extending into the reaction chamber may be carried a layer of active catalyst such as reduced nickel. Such a layer may be produced by painting the desired amount of surface with, for instance, nitrate of nickel and then carefully reducing.

In the reactions contemplated in the present invention, hydrogen cannot be used as the inert gas since it is condensed by the catalytic metals and then reacts. Saturated hydrocarbon gases other than that intended to be produced may be employed; but carbon dioxid, nitrogen or steam are the best agents. Products of the combustion of fuel may be used.

The same expedient of dilution with an inert gas may be employed in making useful products by the direct condensation of acetylene, ethylene, the diolefins and others of the highly reactive unsaturated endothermically constituted hydrocarbon gases and vapors. As stated, these bodies in the absence of hydrogen or other reactive gases nevertheless undergo internal changes on contact with nickel and other catalytic bodies; changes which are apt to become violent and uncontrollable. Acetylene and ethylene are unsaturated compounds of endothermic constitution capable of condensing and polymerizing and of breaking down altogether with liberation of heat under the influence of catalysts. Acetylene has a strong tendency to condensation into benzene hydrocarbons and a still stronger tendency to decompose outright into carbon and hydrogen.

On simply diluting an unsaturated gas with an inert gas these changes can be regulated and controlled; can be stopped at any point desired. For example, the various diolefins can be converted into polymerized bodies, and the reaction stopped at a desired point by simply controlling the temperature of the catalyst at a suitable point while preventing violent local actions by dilution.

In all cases, prior to beginning work with a catalyst it should be freed from adsorbed gases by a current of inert gas or by a vacuum. In preparing reduced nickel, for example, the metal is usually reduced from the oxid with hydrogen or other reducing gas; and is left charged with such reducing gas. If a reaction mixture be now introduced into contact with it, the adsorbed hydrogen or other reducing gas at once becomes active and intense local temperatures may be induced. After reduction, therefore, it is always better to pass an indifferent gas, such as carbon dioxid, steam or nitrogen over the metal; or to cool in a vacuum.

What we claim is:—

1. The process of forming unsaturated carbon compounds by additive reaction which comprises, forming a dilute gaseous mixture of an unsaturated carbon compound with the gaseous form of a substance with which it will react to form an additive product, and passing the dilute mixture over a catalyst, the diluent being inert in the reaction, and present in such quantity relative to the time of exposure to the catalyst as to inhibit the formation of a saturated carbon compound.

2. The process of forming unsaturated carbon compounds, which comprises forming a dilute gaseous mixture of an unsaturated carbon compound with a gaseous form of a substance with which it will react to form an additive compound, and passing the diluted mixture over a temperature controlled catalyst, the diluent being inert in the reaction and present in such quantity relative to the time of exposure to the catalyst and to the temperature thereof as to inhibit the formation of a saturated carbon compound.

3. In the catalytic treatment of acetylene in an exothermic reaction the process of restraining the exothermic reaction which comprises adding a diluent gas inert to at least one of the reacting substances and passing the diluted gaseous mixture over a catalyst.

4. In the catalytic treatment of acetylene in an exothermic reaction the process of restraining the exothermic reaction which comprises adding a diluent gas inert to at least one of the reacting substances and passing the diluted gaseous mixture over a temperature-controlled catalyst.

5. In the catalytic treatment of acetylene in an exothermic reaction the process of restraining the exothermic reaction which comprises adding a diluent gas inert to at least one of the reacting substances and passing the diluted gaseous mixture over a catalyst comprising reduced metal.

6. In the catalytic treatment of acetylene in an exothermic reaction the process of restraining the exothermic reaction which comprises adding a diluent gas inert to at least one of the reacting substances and passing the diluted gaseous mixture over a catalyst comprising reduced nickel.

7. In the manufacture of ethylene, the process which comprises adding a diluent inert gas to a mixture of substantially equal volumes of acetylene and hydrogen and passing the diluted gaseous mixture over a catalyst.

8. In the manufacture of ethylene, the process which comprises adding a diluent inert gas to a mixture of substantially equal volumes of acetylene and hydrogen and passing the diluted gaseous mixture over a temperature-controlled catalyst.

9. In the manufacture of ethylene, the process which comprises adding carbon dioxid as a diluent gas to a mixture of substantially equal volumes of acetylene and hydrogen and passing the diluted gaseous mixture over a catalyst.

10. In the manufacture of ethylene, the process which comprises adding carbon dioxid as a diluent gas to a mixture of substantially equal volumes of acetylene and hydrogen and passing the diluted gaseous mixture over a temperature-controlled catalyst.

11. In the manufacture of ethylene, the process which comprises adding carbon dioxid as a diluent gas to a mixture of substantially equal proportions of acetylene and hydrogen and passing the mixture over a catalyst comprising reduced metal.

12. In the manufacture of ethylene, the process which comprises adding carbon dioxid as a diluent gas to a mixture of substantially equal proportions of acetylene and hydrogen and passing the mixture over a catalyst comprising reduced nickel.

13. In the manufacture of ethylene gas from acetylene and hydrogen in the presence of a catalyst the admixture of a neutral diluent gas to at least one of the reacting substances in predetermined proportion to retard, regulate and control the velocity of reaction.

14. In the manufacture of ethylene gas from acetylene and hydrogen in the presence of a catalyst the admixture of carbon dioxid in predetermined proportion to retard, regulate and control the velocity of reaction.

15. In the addition of hydrogen to unsaturated hydrocarbons in gaseous form, the process which comprises freeing a catalyst from adsorbed gases, and then passing the reacting hydrocarbons and hydrogen over said catalyst in the presence of a diluent gas inert in the reaction.

16. In the manufacture of ethylene gas from acetylene and hydrogen in the presence of a catalyst the mixture of acetylene and hydrogen with carbon dioxid in predetermined proportion to retard, regulate and control the velocity of reaction, the removing of the ethylene, and the recovering of the carbon dioxid for reuse in carrying out the process.

In testimony whereof, we affix our signatures in the presence of two subscribing witnesses.

BYRON E. ELDRED.
GAIL MERSEREAU.

Witnesses:
JOHN A. RILEY,
L. M. SUTTON.